(12) United States Patent
Lin et al.

(10) Patent No.: US 7,261,573 B2
(45) Date of Patent: Aug. 28, 2007

(54) LATCH STRUCTURE AND ELECTRONIC APPARATUS

(75) Inventors: San-Feng Lin, Taipei (TW); Shih-Chieh Sun, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 346 days.

(21) Appl. No.: 11/029,505

(22) Filed: Jan. 6, 2005

(65) Prior Publication Data
US 2005/0206169 A1  Sep. 22, 2005

(30) Foreign Application Priority Data
Mar. 19, 2004 (TW) .............................. 93107595 A

(51) Int. Cl.
*H01R 13/44* (2006.01)
(52) U.S. Cl. ........................ 439/135; 361/681; 361/683
(58) Field of Classification Search ................ 439/135, 439/144, 147; 296/24
See application file for complete search history.

(56) References Cited

U.S. PATENT DOCUMENTS

| | | | |
|---|---|---|---|
| 6,108,196 A * | 8/2000 | Jung ........................... 361/683 |
| 6,517,129 B1 * | 2/2003 | Chien et al. ............. 292/251.5 |
| 6,707,665 B2 * | 3/2004 | Hsu et al. .................... 361/681 |
| 6,927,972 B1 * | 8/2005 | Wang et al. ................ 361/683 |
| 6,965,512 B2 * | 11/2005 | Huang et al. ............... 361/683 |
| 7,164,578 B2 * | 1/2007 | Wang et al. ................ 361/683 |

* cited by examiner

*Primary Examiner*—X. Chung-Trans
(74) *Attorney, Agent, or Firm*—Birch, Stewart, Kolasch, & Birch, LLP.

(57) ABSTRACT

A hook-linked latch structure is for latching a first shell body and a second shell body. A first opening and a second opening are disposed on the first shell body. The latch structure includes a latch, at least one first hook and a second hook. The latch having a first connecting portion is disposed in the first shell body. At least one portion of the latch is in contact with a first elastomer. The first hook connecting with the latch is positioned on the first shell body and near the first opening. A second connecting portion is at the first hook. The second hook pivots on the first shell body and nears the second opening. The second hook has a third connecting portion and a pressing portion. The third connecting portion connects with the first connecting portion and the latch is at a first position.

20 Claims, 6 Drawing Sheets

LATCH STRUCTURE AND ELECTRONIC APPARATUS

BACKGROUND OF THE INVENTION

1. Field of Invention

The invention relates to a latch structure and an electronic device, and more particularly to a hidden latch structure for latching a notebook computer and an electrical device using this latch structure.

2. Related Art

Notebook computers have been widely used among the current information products because they have the main advantage of good mobility and capable of being carried by the user to anywhere according to the requirements. In the highly developed and advanced information technology, a notebook computer may serve as a mobile workstation capable of enabling the network information acquisition and transmission and the database management. So, the notebook computer is the best choice for implementing the mobile office. In addition to the consideration of the software pack, the notebook computer still has to take the human-oriented operations into important considerations, such as the interface connection convenience, weight, and operation convenience.

The notebook computer is mainly composed of a host and a liquid crystal display, which have to be opened during the usage, and the notebook computer can be operated using the keyboard on the host base or the connected mouse. After being used, the host and liquid crystal display have to be closed to facilitate the storage and portability. In order to prevent the liquid crystal display from being unintentionally opened and thus damaged after the computer is closed, a locking assembly is attached to the host base and the liquid crystal display to lock the notebook computer. As shown in FIG. 1, the conventional electrical device 1 has a liquid crystal display 11, a host 12 and a locking assembly 13. The locking assembly 13 includes a hook 131, a slot 132 and a push button 133. When the liquid crystal display 11 and the host 12 are to be closed and locked, the hook 131 disposed on liquid crystal display 11 is used to hook the slot 132 on the host 12. Consequently, the closed liquid crystal display 11 and host 12 can be fixed, the keys disposed on the host 12 and the monitor of the liquid crystal display 11 are protected, and the notebook computer can be conveniently carried. When the notebook computer is to be opened, the push button 133 connected to the hook 131 has to be actuated in order to eliminate the locking state of the locking assembly 13.

However, the hook 131 of the locking assembly 13 is exposed out of the liquid crystal display 11. Thus, it is possible to influence the glory and tends to cause the deformation or fracture of the locking assembly 13 when the user opens or closes the notebook computer and unintentionally touches the hook.

In view of the above-mentioned problems, it is an important subject of the invention to provide a hook-linked latch structure and an electronic device capable of eliminating the drawbacks in the exposed hook that tends to be deformed and damaged.

SUMMARY OF THE INVENTION

In view of the foregoing, the invention is to provide a hidden hook-linked latch structure, which has a hook that is not exposed out of an electronic device but still can normally latch a first shell body and a second shell body of the electronic device.

In addition, the invention is to provide an electronic device having a hidden hook-linked latch structure, which has a hook that is not exposed out of an electronic device but still can normally latch a first shell body and a second shell body of the electronic device.

To achieve the above, the invention provides a hook-linked latch structure for latching a first shell body and a second shell body, wherein a first opening and a second opening are disposed on the first shell body. The latch structure includes a latch, at least one first hook and a second hook. The latch is disposed on the first shell body and has a first connecting portion. At least one portion of the latch is in contact with a first elastomer. The first hook connects with the latch and is positioned in the first shell body and near the first opening. A second connecting portion is set at the first hook. The second hook pivots on the first shell body, nears the second opening, and has a third connecting portion and a pressing portion. The third connecting portion connects with the first connecting portion and the latch is at a first position. When the pressing portion is pressed, the first connecting portion is separated from the third connecting portion, the latch is pushed by the first elastomer and the first hook is pushed by the latch such that the second connecting portion connects with the second shell body.

To achieve the above, the electronic device of the invention includes a first shell body, a second shell body, a latch, at least one first hook, and a second hook. A first opening and a second opening are disposed on the first shell body. The second shell body pivots on the first shell body. The latch is disposed on the first shell body. The latch has a first connecting portion, and at least one portion of the latch is in contact with a first elastomer. The first hook connects with the latch. The first hook is positioned on the first shell body and near the first opening. A second connecting portion is set at the first hook. The second hook pivots on the first shell body and nears the second opening. The second hook has a third connecting portion and a pressing portion. The third connecting portion connects with the first connecting portion and the latch is at a first position at this time. When the pressing portion is pressed, the first connecting portion is separated from the third connecting portion, the latch is pushed by the first elastomer, and the first hook is pushed by the latch such that the second connecting portion connects with the second shell body.

As mentioned above, the hook-linked latch structure and the electronic device of the invention provide a hidden hook-linked latch structure. That is, when the first shell body and the second shell body of the electronic device are in the opened state, the overall hook-linked latch structure are hidden in the first shell body. When the first shell body and the second shell body are in the closed state, the hook of the hook-linked latch structure extends out of the first shell body and fastens to the second shell body so as to latch the first shell body and the second shell body of the electronic device. Compared to the prior art, when the first shell body and the second shell body are in an opened state, the hook of the hook-linked latch structure of the invention is free from being exposed. Thus, the condition that the exposed hook is deformed and damaged when the user unintentionally touches the exposed hook of the prior art can be eliminated. In addition, the hook-linked latch structure and the electronic device of the invention can ensure that the electronic device cannot be unintentionally opened during the carrying process. Accordingly, the liquid crystal display and the keyboard of the electrical device can be protected. Furthermore, the hidden hook-linked latch structure of the invention further improves the visual glory of the integral electrical device.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
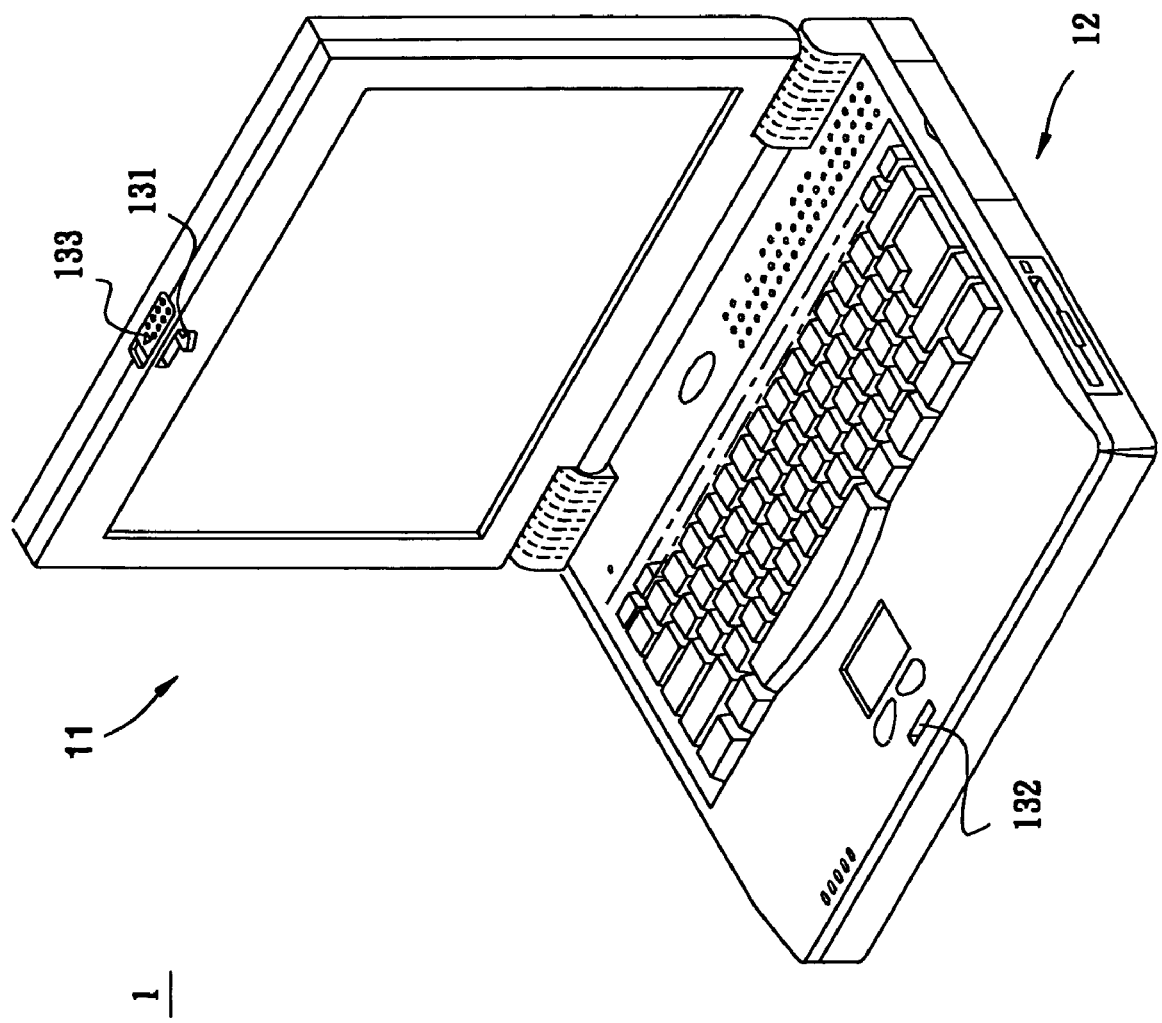
FIG. 1 is a schematic illustration showing an electronic device and a locking assembly according to the prior art.
Figure 2:
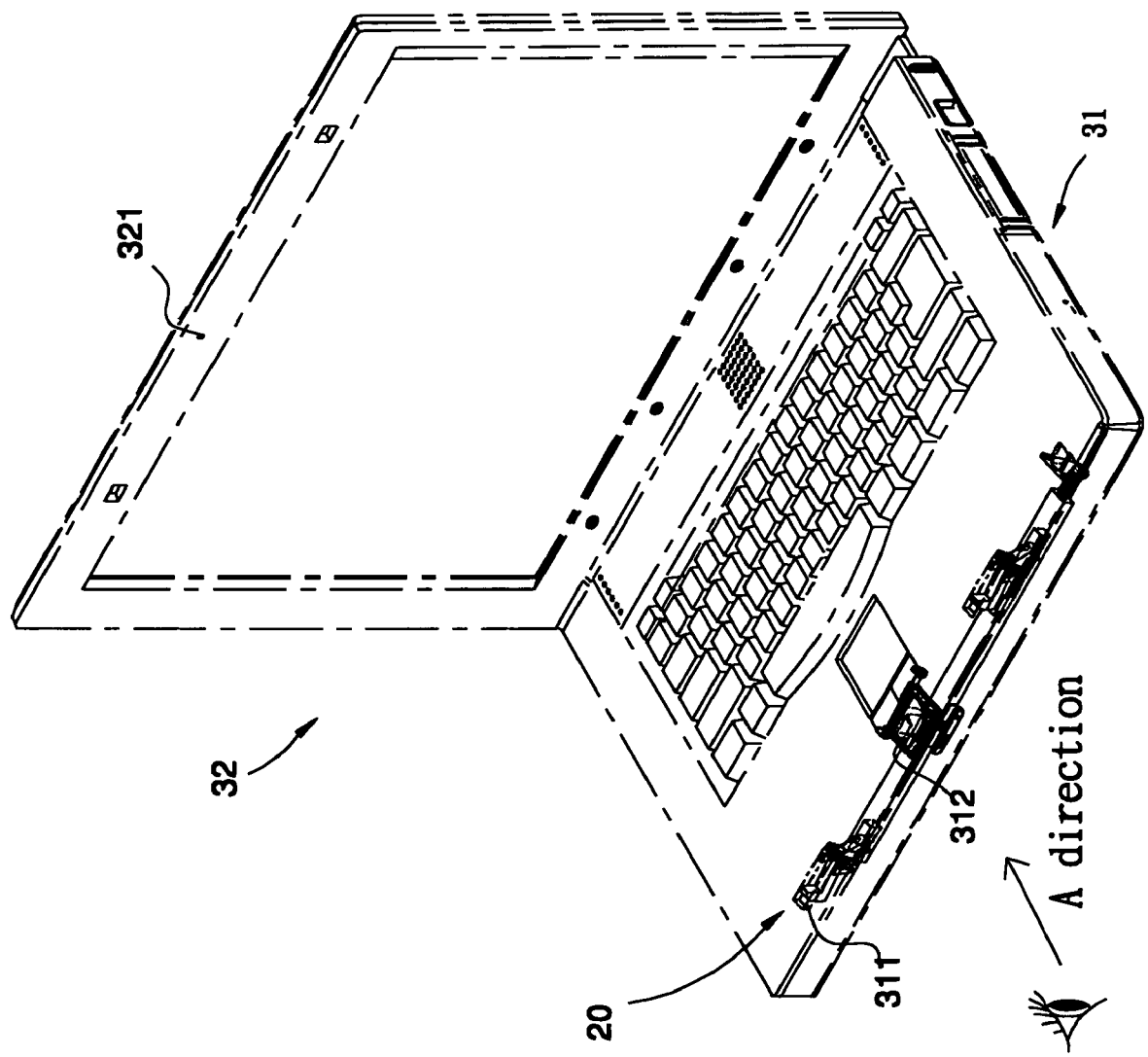
FIG. 2 is a schematic illustration showing a hook-linked latch structure and an electronic device according to an embodiment of the invention.
Figure 3:
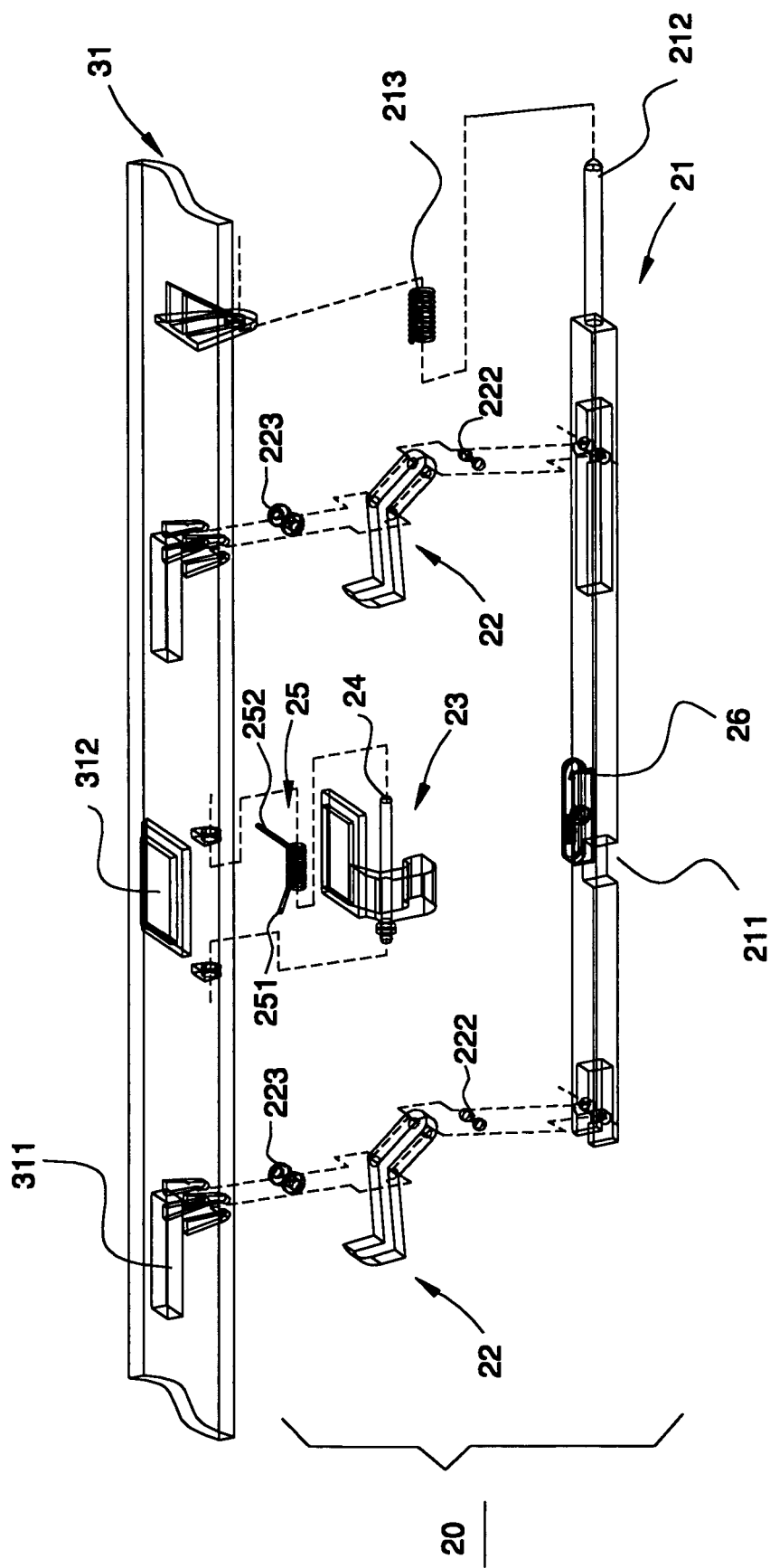
FIG. 3 is an exploded view showing the hook-linked latch structure according to the embodiment of the invention.

As shown in FIGS. 2 and 3, a hook-linked latch structure 20 is for latching a first shell body 31 and a second shell body 32. A first opening 311 and a second opening 312 are disposed on the first shell body 31. In this embodiment, a notebook computer will be described as an example. The first shell body 31 is a host shell body, and the second shell body 32 is a side frame of a LCD (Liquid Crystal Display) panel. Of course, the first shell body 31 also may be the side frame of the LCD panel, and the second shell body 32 also may be the host shell body.

With reference to FIG. 3, the hook-linked latch structure 20 includes a latch 21, at least one first hook 22 and a second hook 23.

The latch 21 is disposed on the first shell body 31 and has a first connecting portion 211. An end portion 212 of the latch 21 and a first elastomer 213 are mounted in the first shell body 31, and the end portion 212 is in contact with the first elastomer 213. In this embodiment, the first elastomer 213 is a compression spring, and the first elastomer 213 connects with the end portion 212 of the latch 21.

Figure 4:
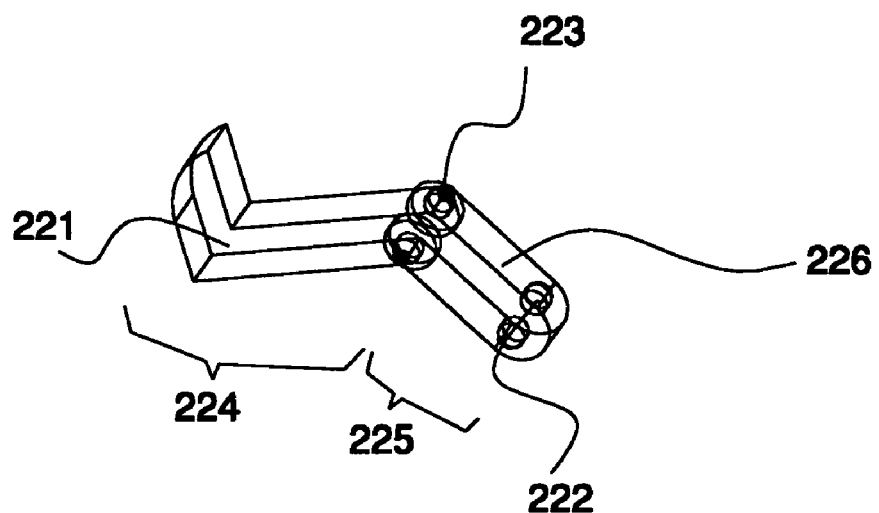
FIG. 4 is a schematic illustration showing a first hook of the hook-linked latch structure according to the embodiment of the invention.

As shown in FIGS. 3 and 4, the first hook 22 connects with the latch 21. The first hook 22 is positioned on the first shell body 31 and near the first opening 311. A second connecting portion 221 is set at the first hook 22. The first hook 22 connects with the latch 21 through a first rotating shaft 222, and further connects with the first shell body 31 through a second rotating shaft 223.

In addition, a first side 224 of the first hook 22 is the second connecting portion 221, and a second side 225 of the first hook 22 is an extension 226 connecting with the second connecting portion 221. The first rotating shaft 222 and the second rotating shaft 223 pass through two sides of the extension 226, respectively. In the embodiment, since the first rotating shaft 222 and the second rotating shaft 223 are provided, the first hook 22 can connect with the latch 21 and the first shell body 31. Thus, the second connecting portion 221 and the latch 21 can move together.

Figure 5:
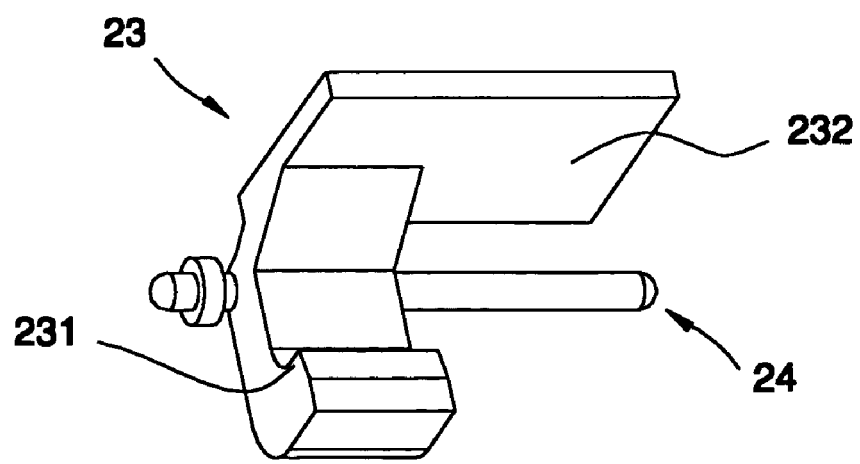
FIG. 5 is a schematic illustration showing a second hook and a third rotating shaft of the hook-linked latch structure according to the embodiment of the invention.
Figure 6:
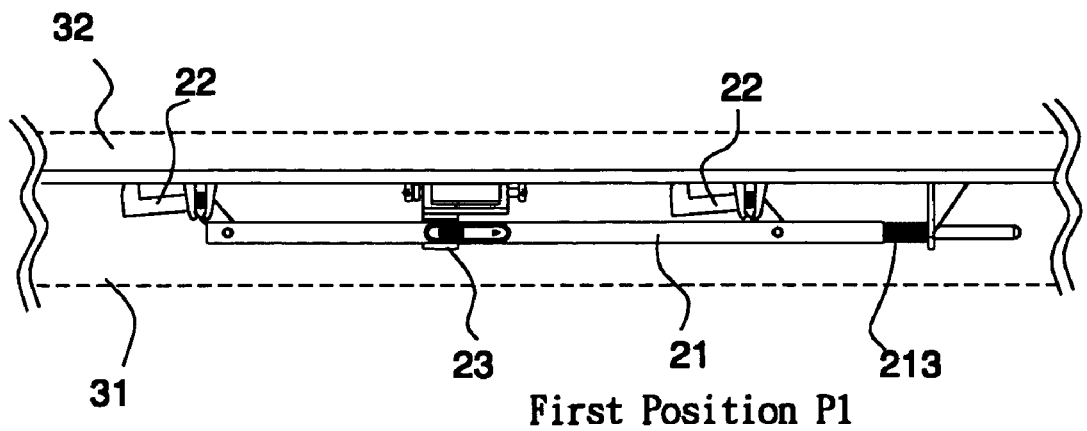
FIG. 6 shows a perspective view of the hook-linked latch structure according to the embodiment of the invention, which is taken along an A direction shown in FIG. 2 when the first shell body and the second shell body are opened and the latch is at the first position P1.

As shown in FIGS. 3, 5 and 6, the second hook 23 pivots on the first shell body 31 and nears the second opening 312. The second hook 23 has a third connecting portion 231 and a pressing portion 232. The second hook 23 may have a U-shape, and the third connecting portion 231 and the pressing portion 232 are respectively set at two sides of the second hook 23. In this embodiment, the first connecting portion 211 is a slot, and the third connecting portion 231 is a hook. Of course, the first connecting portion 211 may be a hook, and the third connecting portion 231 may be a slot. In addition, the third connecting portion 231 connects with the first connecting portion 211, and, at this moment, the latch 21 is at a first position P1 (as shown in FIG. 6) and the first elastomer 213 is in a compression state.

Referring to FIG. 3 again, the hook-linked latch structure 20 further includes a third rotating shaft 24 and a second elastomer 25. The third rotating shaft 24 connects with the first shell body 31 and is positioned between the third connecting portion 231 and the pressing portion 232. The second elastomer 25 connects with the third rotating shaft 24, a first end 251 of the second elastomer 25 touches the second hook 23, and a second end 252 of the second elastomer 25 touches the first shell body 31. In this embodiment, the second elastomer 25 may be a torsion spring, the pressing portion 232 is located in the second opening 312, and the second elastomer 25 is in a loose state.

Figure 7:
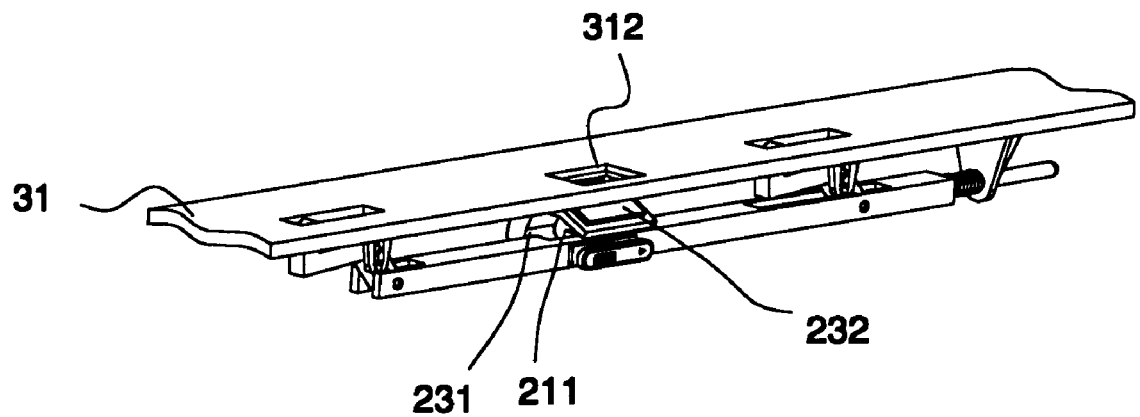
FIG. 7 is a schematic illustration showing the hook-linked latch structure according to the embodiment of the invention when a pressing portion is pressed down and the second hook is separated from the first connecting portion.
Figure 8:
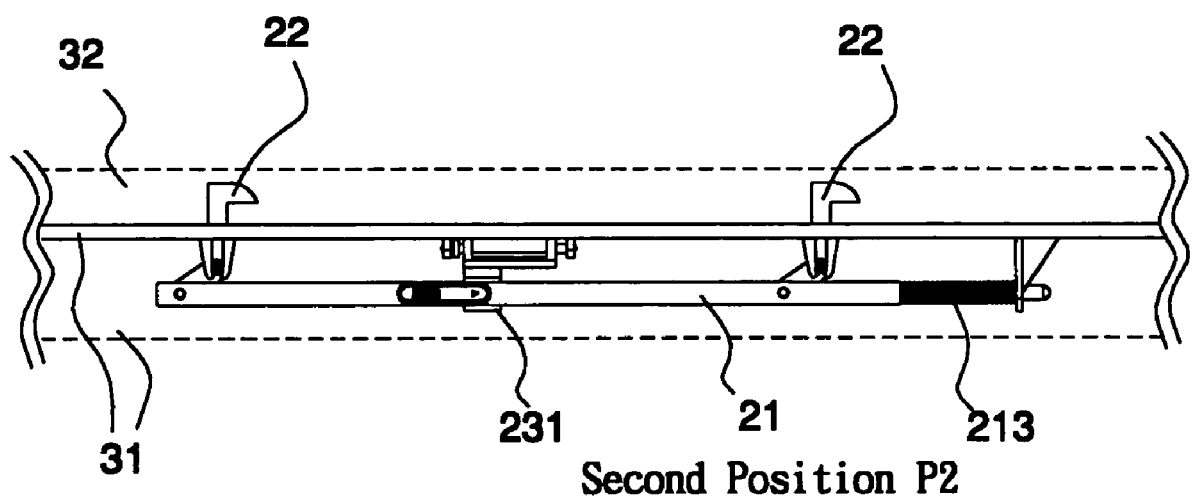
FIG. 8 shows a perspective view of the hook-linked latch structure according to the embodiment of the invention, which is taken along an A direction shown in FIG. 2 when the first shell body and the second shell body are closed and the latch is at the second position P2.

As shown in FIGS. 2, 7 and 8, the second shell body 32 of this embodiment further includes a protrusion 321, which passes through the second opening 312 and presses down the pressing portion 232 when the second shell body 32 and the first shell body 31 are closed. Because the third rotating shaft 24 is disposed on a side of the second hook 23, the second hook 23 is caused to rotate the third connecting portion 231 away from the first connecting portion 211 when the protrusion 321 presses down the pressing portion 232, wherein the second elastomer 25 is in a torsion state. Thereafter, the first elastomer 213 pushes the latch 21 from the first position P1 and to a second position P2 (as shown in FIG. 8), and the first elastomer 213 is at a loose state. In such a case, the latch 21 pushes the first hook 22 such that the second connecting portion 221 connects with the second shell body 32.

In this embodiment, the hook-linked latch structure 20 further includes a button 26 connecting with the latch 21 (as shown in FIGS. 2, 6 and 8). When the second hook 23 is separated from the first connecting portion 211 (i.e., when the latch 21 is at the second position P2), the user can push the button 26 to compress the first elastomer 213 such that the latch 21 returns to the first position P1 and separates the first hook 22 from the second shell body 32. When the first shell body 31 and the second shell body 32 are separated, the protrusion 321 and the pressing portion 232 are also separated and the second elastomer 25 returns to the loose state so as to drive the second hook 23 to connect with the first connecting portion 211 again.

Hereinafter, an electronic apparatus 3 according to a preferred embodiment of the invention is described with reference to FIGS. 2 to 8.

Referring to FIGS. 2 and 3, the electronic device 3 includes a first shell body 31, a second shell body 32, a latch 21, at least one first hook 22 and a second hook 23. Herein, the first shell body 31, the second shell body 32, the latch 21, the first hook 22 and the second hook 23 are referred to as the hook-linked latch structure 20.

As shown in FIG. 2, the electronic apparatus 3 can be a notebook computer, a personal assistant (PDA), or other portable data processing apparatus. In this embodiment, for example, the electronic device 3 is a notebook computer. The first shell body 31 is a host shell body and the second shell body 32 is a side frame of a LCD panel. Of course, the first shell body 31 also may be the side frame of the LCD panel, and the second shell body 32 also may be the host shell body. As shown in FIGS. 2 and 3, the hook-linked latch structure 20 is for latching a first shell body 31 and a second shell body 32. A first opening 311 and a second opening 312 are disposed on the first shell body 31. In this embodiment, a notebook computer will be described as an example. The first shell body 31 is a host shell body, and the second shell body 32 is a side frame of a LCD (Liquid Crystal Display) panel. Of course, the first shell body 31 also may be the side frame of the LCD panel, and the second shell body 32 also may be the host shell body. The latch 21 is disposed on the first shell body 31 and has a first connecting portion 211. An end portion 212 of the latch 21 and a first elastomer 213 are mounted in the first shell body 31, and the end portion 212 is in contact with the first elastomer 213. In this embodiment, the first elastomer 213 is a compression spring, and the first elastomer 213 connects with the end portion 212 of the latch 21.

As shown in FIGS. 3 and 4, the first hook 22 connects with the latch 21. The first hook 22 is positioned on the first shell body 31 and near the first opening 311. A second connecting portion 221 is set at the first hook 22. The first hook 22 connects with the latch 21 through a first rotating shaft 222, and further connects with the first shell body 31 through a second rotating shaft 223.

In addition, a first side 224 of the first hook 22 is the second connecting portion 221, and a second side 225 of the first hook 22 is an extension 226 connecting with the second connecting portion 221. The first rotating shaft 222 and the second rotating shaft 223 pass through two sides of the extension 226, respectively. In the embodiment, since the first rotating shaft 222 and the second rotating shaft 223 are provided, the first hook 22 can connect with the latch 21 and the first shell body 31. Thus, the second connecting portion 221 and the latch 21 can move together.

As shown in FIGS. 3, 5 and 6, the second hook 23 pivots on the first shell body 31 and nears the second opening 312. The second hook 23 has a third connecting portion 231 and a pressing portion 232. The second hook 23 may have a U-shape, and the third connecting portion 231 and the pressing portion 232 are respectively set at two sides of the second hook 23. In this embodiment, the first connecting portion 211 is a slot, and the third connecting portion 231 is a hook. Of course, the first connecting portion 211 may be a hook, and the third connecting portion 231 may be a slot.

In addition, the third connecting portion 231 connects with the first connecting portion 211, and, at this moment, the latch 21 is at a first position P1 (as shown in FIG. 6) and the first elastomer 213 is in a compression state.

Referring to FIG. 3 again, the hook-linked latch structure 20 further includes a third rotating shaft 24 and a second elastomer 25. The third rotating shaft 24 connects with the first shell body 31 and is positioned between the third connecting portion 231 and the pressing portion 232. The second elastomer 25 connects with the third rotating shaft 24, a first end 251 of the second elastomer 25 touches the second hook 23, and a second end 252 of the second elastomer 25 touches the first shell body 31. In this embodiment, the second elastomer 25 may be a torsion spring, the pressing portion 232 is located in the second opening 312, and the second elastomer 25 is in a loose state.

As shown in FIGS. 2, 7 and 8, the second shell body 32 of this embodiment further includes a protrusion 321, which passes through the second opening 312 and presses down the pressing portion 232 when the second shell body 32 and the first shell body 31 are closed. Because the third rotating shaft 24 is disposed on a side of the second hook 23, the second hook 23 is caused to rotate the third connecting portion 231 away from the first connecting portion 211 when the protrusion 321 presses down the pressing portion 232, wherein the second elastomer 25 is in a torsion state. Thereafter, the first elastomer 213 pushes the latch 21 from the first position P1 and to a second position P2 (as shown in FIG. 8), and the first elastomer 213 is at a loose state. In such a case, the latch 21 pushes the first hook 22 such that the second connecting portion 221 connects with the second shell body 32.

In this embodiment, the hook-linked latch structure 20 further includes a button 26 connecting with the latch 21 (as shown in FIGS. 2, 6 and 8). When the second hook 23 is separated from the first connecting portion 211 (i.e., when the latch 21 is at the second position P2), the user can push the button 26 to compress the first elastomer 213 such that the latch 21 returns to the first position P1 and separates the first hook 22 from the second shell body 32. When the first shell body 31 and the second shell body 32 are separated, the protrusion 321 and the pressing portion 232 are also separated and the second elastomer 25 returns to the loose state so as to drive the second hook 23 to connect with the first connecting portion 211 again.

In summary, the hook-linked latch structure and the electronic device of the invention provide a hidden hook-linked latch structure. That is, when the first shell body and the second shell body of the electronic device are in the opened state, the overall hook-linked latch structure are hidden in the first shell body. When the first shell body and the second shell body are in the closed state, the hook of the hook-linked latch structure extends out of the first shell body and fastens to the second shell body so as to latch the first shell body and the second shell body of the electronic device. Compared to the prior art, when the first shell body and the second shell body are in an opened state, the hook of the hook-linked latch structure of the invention is free from being exposed. Thus, the condition that the exposed hook is deformed and damaged when the user unintentionally touches the exposed hook of the prior art can be eliminated. In addition, the hook-linked latch structure and the electronic device of the invention can ensure that the electronic device cannot be unintentionally opened during the carrying process. Accordingly, the liquid crystal display and the keyboard of the electrical device can be protected.

Furthermore, the hidden hook-linked latch structure of the invention further improves the visual glory of the integral electrical device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A latch structure for latching a first shell body and a second shell body, wherein a first opening and a second opening are disposed on the first shell body, the latch structure comprising:
   a latch, which is disposed on the first shell body and has a first connecting portion, wherein at least one portion of the latch is in contact with a first elastomer;
   at least one first hook, which connects with the latch and is positioned in the first shell body and near the first opening, wherein a second connecting portion is set at the first hook; and
   a second hook, which pivots on the first shell body, nears the second opening, and has a third connecting portion and a pressing portion, wherein the third connecting portion connects with the first connecting portion while the latch is at a first position, and when the pressing portion is pressed, the first connecting portion is separated from the third connecting portion, then the latch is pushed by the first elastomer and the first hook is pushed by the latch such that the second connecting portion connects with the second shell body.

2. The latch structure according to claim 1, wherein the second shell body comprises a protrusion, and when the second shell body and the first shell body are closed, the protrusion passes through the second opening and presses down the pressing portion so as to rotate the third connecting portion away from the first connecting portion.

3. The latch structure according to claim 2, further comprising:
   a button, which connects with the latch, wherein when the second hook is separated from the first connecting portion, the button is pushed to compress the first elastomer such that the latch returns to the first position and drives the first hook away from the second shell body resulting in that the first shell body is separated from the second shell body, the protrusion is also separated from the pressing portion, and the second hook again connects with the first connecting portion.

4. The latch structure according to claim 1, wherein the first hook connects with the latch through a first rotating shaft, and the first hook further connects with the first shell body through a second rotating shaft.

5. The latch structure according to claim 4, wherein a first side of the first hook is the second connecting portion, a second side of the first hook is an extension, and the first rotating shaft and the second rotating shaft pass through two sides of the extension.

6. The latch structure according to claim 1, further comprising a third rotating shaft and a second elastomer, wherein the third rotating shaft passes through the second hook and connects with the first shell body, the second elastomer connects with the third rotating shaft, a first end of the second elastomer connects with the second hook, and a second end of the second elastomer connects with the first shell body.

7. The latch structure according to claim 1, wherein the second hook has a U-shape, and the third connecting portion and the pressing portion are located at two sides of the second hook, respectively.

8. The latch structure according to claim 6, wherein the first elastomer is a compression spring, and the second elastomer is a torsion spring.

9. The latch structure according to claim 1, wherein the first connecting portion is a slot, and the third connecting portion is a hook.

10. The latch structure according to claim 1, wherein the first connecting portion is a hook, and the third connecting portion is a slot.

11. An electronic apparatus, comprising:
    a first shell body, wherein a first opening and a second opening are disposed on the first shell body;
    a second shell body;
    a latch, which is disposed on the first shell body and has a first connecting portion, wherein at least one portion of the latch is in contact with a first elastomer;
    at least one first hook, which connects with the latch and is positioned in the first shell body and near the first opening, wherein a second connecting portion is set at the first hook; and
    a second hook, which pivots on the first shell body, nears the second opening, and has a third connecting portion and a pressing portion, wherein the third connecting portion connects with the first connecting portion while the latch is at a first position, and when the pressing portion is pressed, the first connecting portion is separated from the third connecting portion, then the latch is pushed by the first elastomer and the first hook is pushed by the latch such that the second connecting portion connects with the second shell body.

12. The electronic apparatus according to claim 11, wherein the second shell body comprises a protrusion, and when the second shell body and the first shell body are closed, the protrusion passes through the second opening and presses down the pressing portion so as to rotate the third connecting portion away from the first connecting portion.

13. The electronic apparatus according to claim 11, further comprising:
    a button, which connects with the latch, wherein when the second hook is separated from the first connecting portion, the button is pushed to compress the first elastomer such that the latch returns to the first position and drives the first hook away from the second shell body resulting in that the first shell body is separated from the second shell body, the protrusion is also separated from the pressing portion, and the second hook again connects with the first connecting portion.

14. The electronic apparatus according to claim 11, wherein the first hook connects with the latch through a first rotating shaft, and the first hook further connects with the first shell body through a second rotating shaft.

15. The electronic apparatus according to claim 14, wherein a first side of the first hook is the second connecting portion, a second side of the first hook is an extension, and the first rotating shaft and the second rotating shaft pass through two sides of the extension.

16. The electronic apparatus according to claim 11, further comprising a third rotating shaft and a second elastomer, wherein the third rotating shaft passes through the second hook and connects with the first shell body, the second elastomer connects with the third rotating shaft, a first end of the second elastomer connects with the second hook, and a second end of the second elastomer connects with the first shell body.

17. The electronic apparatus according to claim 11, wherein the second hook has a U-shape, and the third connecting portion and the pressing portion are located at two sides of the second hook, respectively.

18. The electronic apparatus according to claim 16, wherein the first elastomer is a compression spring, and the second elastomer is a torsion spring.

19. The electronic apparatus according to claim 13, wherein the first connecting portion is a slot, and the third connecting portion is a hook.

20. The electronic apparatus according to claim 13, wherein the first connecting portion is a hook, and the third connecting portion is a slot.

* * * * *